(12) United States Patent
Sogabe et al.

(10) Patent No.: US 6,738,569 B1
(45) Date of Patent: May 18, 2004

(54) OMNIDIRECTIONAL VISUAL CAMERA

(75) Inventors: Yasushi Sogabe, Nishinomiya (JP); Shigeki Murata, Nara (JP)

(73) Assignee: Matsushita Electric Industrial Co., Ltd. (JP)

( * ) Notice: Subject to any disclaimer, the term of this patent is extended or adjusted under 35 U.S.C. 154(b) by 159 days.

(21) Appl. No.: 09/889,888

(22) PCT Filed: Nov. 28, 2000

(86) PCT No.: PCT/JP00/08360
§ 371 (c)(1),
(2), (4) Date: Jul. 24, 2001

(87) PCT Pub. No.: WO01/40863
PCT Pub. Date: Jun. 7, 2001

(30) Foreign Application Priority Data

Nov. 30, 1999 (JP) ............................................. 11-338859

(51) Int. Cl.⁷ .............................................. G03B 37/02
(52) U.S. Cl. .......................... 396/21; 396/351; 396/427; 348/36
(58) Field of Search .......................... 396/21, 351, 427; 348/36

(56) References Cited

U.S. PATENT DOCUMENTS 4,326,775 A * 4/1982 King ........................... 359/725
6,157,018 A * 12/2000 Ishiguro et al. ........... 250/208.1
6,375,366 B1 * 4/2002 Kato et al. ................... 396/351

FOREIGN PATENT DOCUMENTS

| JP | 2-151828 | 6/1990 |
|---|---|---|
| JP | 4-105476 | 4/1992 |
| JP | 6-141211 | 5/1994 |
| JP | 6-295333 | 10/1994 |
| JP | 11-95344 | 4/1999 |
| JP | 11-174603 | 7/1999 |

* cited by examiner

Primary Examiner—David M Gray
(74) Attorney, Agent, or Firm—Parkhurst & Wendel, L.L.P.

(57) ABSTRACT

To provide an omnidirectional visual camera having a simple configuration and which can pick up omnidirectional images covering an angle of 360° around an axis. This camera comprises a reflecting member and a camera section. The reflecting member is composed of a rotating surface portion, a cylindrical portion and a joining section, which are integrally formed of a transparent material.

2 Claims, 5 Drawing Sheets

OMNIDIRECTIONAL VISUAL CAMERA

TECHNICAL FIELD

The present invention relates to an omnidirectional visual camera for photographing an omnidirectional image that is picked up in all directions around an arbitrary viewpoint position.

BACKGROUND ART

If environments around a certain viewpoint can be imaged at a time, an image free from dead angles can be obtained which allows the viewing direction to be arbitrarily changed as if the viewer was at the site.

As a device for picking up such omnidirectional images, means is known which installs a reflector with a curved surface in the front of a television camera and which picks up images projected on the reflector.

Japanese Patent Laid-Open No. 9-118178 and Japanese Patent Laid-Open No. 11-174603 disclose device configurations having a reflector for allowing omnidirectional images to be picked up.

These specifications disclose that the basic configurations of these devices require, in addition to the reflector and the camera, a support member for fixing the reflector to a front portion of the camera in its optical-axis direction. They also disclose that the support member comprises a transparent material so as not to obstruct generation of a reflected image.

When an image picked up by such a device is geometrically converted, arbitrary viewing directions can be selected to generate an image like one picked up by a normal camera.

The above devices, however, have problems described below.

If the rotating center axis of the reflector is not precisely aligned with the optical axis of the camera, the image may be unexpectedly distorted; the image after the geometrical conversion may be significantly distorted to degrade the image quality. Thus, it is important how to manage the accuracy of the processing of the support member, which determines the relative positioning between the reflector and the camera, as well as the accuracy of the mounting of the support member on the reflector. This disadvantageously increases processing and assembly costs of the support member.

In particular, if the support member and the reflector are installed in a very small camera, the camera fails to provide appropriate performance and is unsuitable for mass production unless the reflector and the support member for supporting the reflector are precisely mounted in the front of the camera.

It is an object of the present invention to provide an omnidirectional visual camera that allows the rotating center axis of the reflector to be precisely aligned with the optical axis of the camera in order to obtain appropriate omnidirectional images.

DISCLOSURE OF INVENTION

An omnidirectional visual camera set forth in aspect 1 of the present invention is characterized by comprising a reflecting member including a rotating surface portion having a convex surface of a rotating secondary curved surface and a cylindrical portion having a cylindrical shape and having a rotating center axis aligning or substantially aligning with a rotating axis of the rotating surface, the rotating surface portion and the cylindrical portion being integrally molded of a transparent material so that an outer diameter portion of the rotating surface portion is inscribed in the cylindrical portion, the projecting surface of the rotating surface portion being processed into a mirror surface, and a camera having an optical axis substantially aligning with the rotating center axis of the reflecting member and installed opposite to the convex surface of the rotating surface portion, the camera picking up a reflected image reflected from the convex surface of the rotating surface portion of the reflecting member.

An omnidirectional visual camera set forth in aspect 2 of the present invention is characterized by comprising a reflecting member including a rotating surface portion having a convex surface of a rotating secondary curved surface, a cylindrical portion having a cylindrical shape and having a rotating center axis substantially aligning with a rotating axis of the rotating surface, and having a cylindrical inner diameter larger than an outer diameter of the rotating surface portion, and a connection section for connecting one longitudinal end of the cylindrical portion and the outer diameter portion of the rotating surface portion, the rotating surface portion, the cylindrical portion, and the connection section being integrally molded of a transparent material, the projecting surface of the rotating surface portion being processed into a mirror surface, and a camera having an optical axis substantially aligning with the rotating center axis of the reflecting member and installed opposite to the convex surface of the rotating surface portion, the camera picking up a reflected image reflected from the convex surface of the rotating surface portion of the reflecting member.

An omnidirectional visual camera set forth in aspect 3 of the present invention is characterized in that in aspect 2, the convex surface of the rotating surface portion has a hyperboloidal shape having an internal focus, and the connection section is configured so that an arbitrary line joining the outer diameter portion of the rotating surface portion and the internal focus together passes through the cylindrical portion.

An omnidirectional visual camera set forth in aspect 4 of the present invention is characterized in that in aspect 2 or 3, the connection section of the reflecting member or both the connection section and a surface of the rotating surface portion which is not processed into a mirror surface are processed so as to block light.

An omnidirectional visual camera set forth in aspect 5 of the present invention is characterized in that in aspect 1 or 4, one end surface of the cylindrical portion to which the rotating surface portion is connected has a smaller diameter than the other end thereof.

As described above, according to the present invention, the simple structure comprising the integrally molded reflecting member and the camera enables omnidirectional images to be photographed at a time. Accordingly, the integral molding prevents errors in the centering between the reflecting surface and the cylindrical surface, thus providing a sufficient geometrical accuracy for omnidirectional image pickup.

Furthermore, with respect to the shape of the integrally molded reflecting member, the cylindrical portion is tapered, thus providing an inexpensive omnidirectional visual camera that is suitable for mass production.

Moreover, the integrally molded reflecting member is designed so that incident light will not be blocked by the connection section, thus enabling reflected light from all the areas of the reflecting surface to be imaged properly.

Accordingly, the present invention achieves the effective use of the reflecting surface and is effective in reducing the size of the device.

Further, when the surface of the reflecting member which is opposite to the camera section is coated, unwanted light is prevented from entering, thus improving the image quality of the omnidirectional visual camera.

BEST MODE FOR CARRYING OUT THE INVENTION

The embodiments of the present invention will be described below with reference to FIGS. 1 to 4.
Embodiment 1

Figure 1:
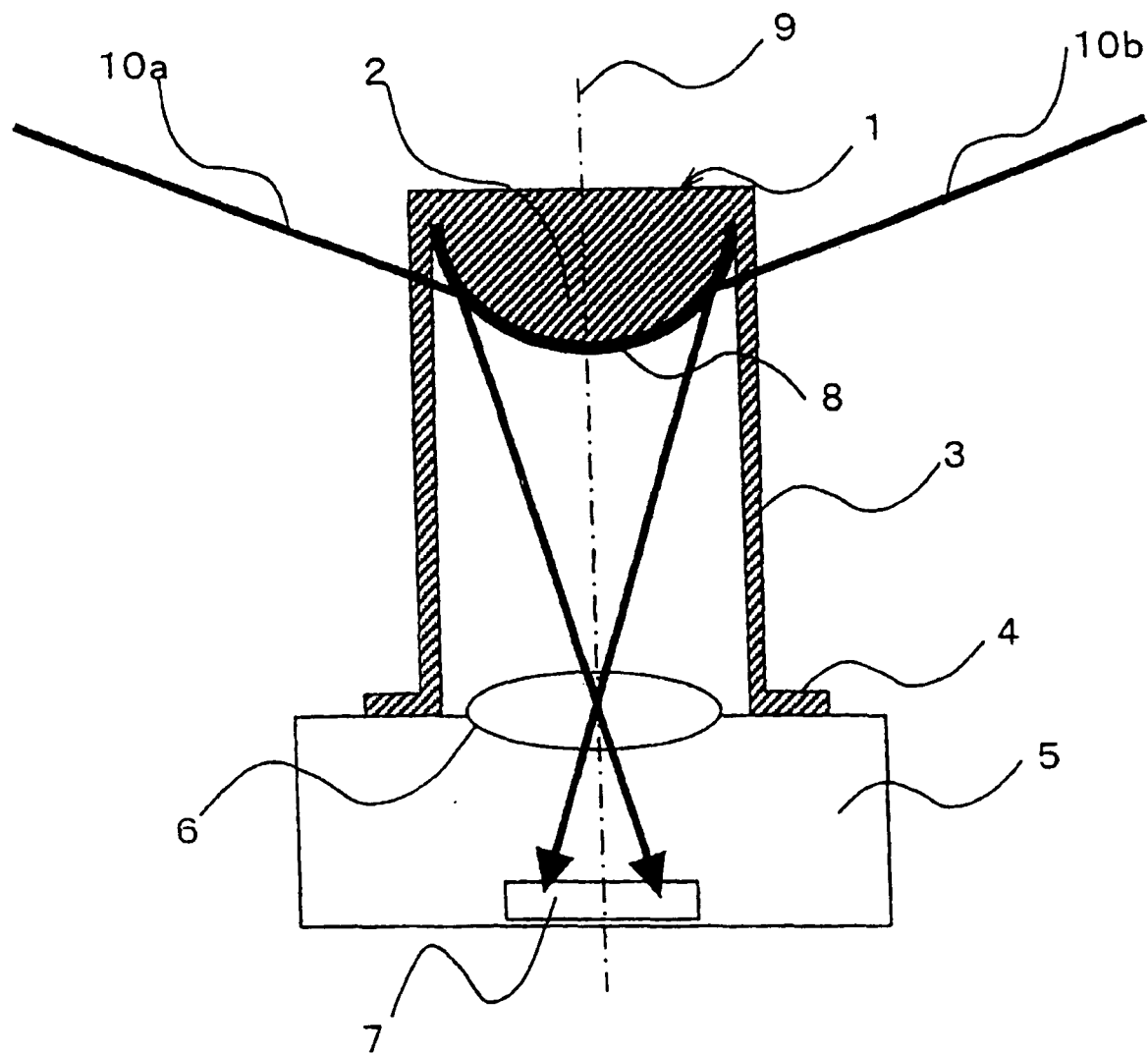
FIG. 1 is a sectional view of an omnidirectional visual camera according to Embodiment 1 of the present invention.

FIG. 1 shows an omnidirectional visual camera according to Embodiment 1.

This omnidirectional visual camera is composed of a reflecting member 1 and a camera section 5.

The reflecting member 1 is a rotationally symmetrical part integrally molded of a transparent material such as glass or an acrylic resin. The reflecting member 1 is composed of a rotating surface portion 2, a cylindrical portion 3, and a joining section 4.

The rotating surface portion 2 has a rotating secondary curved surface, for example, a hyperboloidal shape, and has a reflecting film 8 coated thereon so as to form a mirror surface. The coating is formed by means of aluminum deposition after the integral molding of the reflecting member 1.

The cylindrical portion 3 has a cylindrical shape and has a function of supporting the rotating surface portion 2, having the reflecting film 8, in the direction of the optical axis of the camera section 5. The flange-shaped joining section 4 is a pedestal for joining the reflecting member 1 to the top surface of the camera section 5.

On the other hand, the camera section 7 comprises an electronic camera such as a CCD camera which has a function of outputting, via a lens 6, an image formed on a light receiving element 7. The camera also has a drive circuit for the light receiving element and others, but illustration of such components are omitted.

The rotating center axis of the rotating surface portion 2 and cylindrical portion 3 of the reflecting member 1, and the optical axis of the camera section 5 are arranged so as to align with each other. Reference numeral 9 denotes the aligned center axis.

Beams 10a and 10b are examples of light beams incident on the rotating surface portion 2 from external environments.

The functions of the omnidirectional visual camera will be described below with reference to FIG. 1.

Since the rotating surface portion 2 has the reflecting film 8 formed into the mirror surface, extraneous incident lights such as the beams 10a and 10b pass through the transparent cylindrical portion 3 and are then reflected by the rotating surface portion 2. The beams then pass through the lens 6 of the camera to the light receiving element 7.

In this manner, the beams from all the directions around the center axis 9 are reflected by the reflecting film 8 of the rotating surface portion and then pass through the lens 6 to the light receiving element 7. Consequently, an omnidirectional image covering an angle of 360° is picked up at a time.

The very simple configuration of the camera section 5 and the integrally molded reflecting member 1 composed of the rotating surface portion 2, the cylindrical portion 3, and the joining section 4 enables the configuration of an omnidirectional visual camera for picking up an omnidirectional image covering the angle of 360°.

Furthermore, the integral molding of the reflecting member 1 prevents errors in the centering and inclination between the rotating surface portion 2 and the cylindrical portion 3, thereby ensuring a sufficient geometrical accuracy and thus appropriate images.
Embodiment 2

Figure 2:
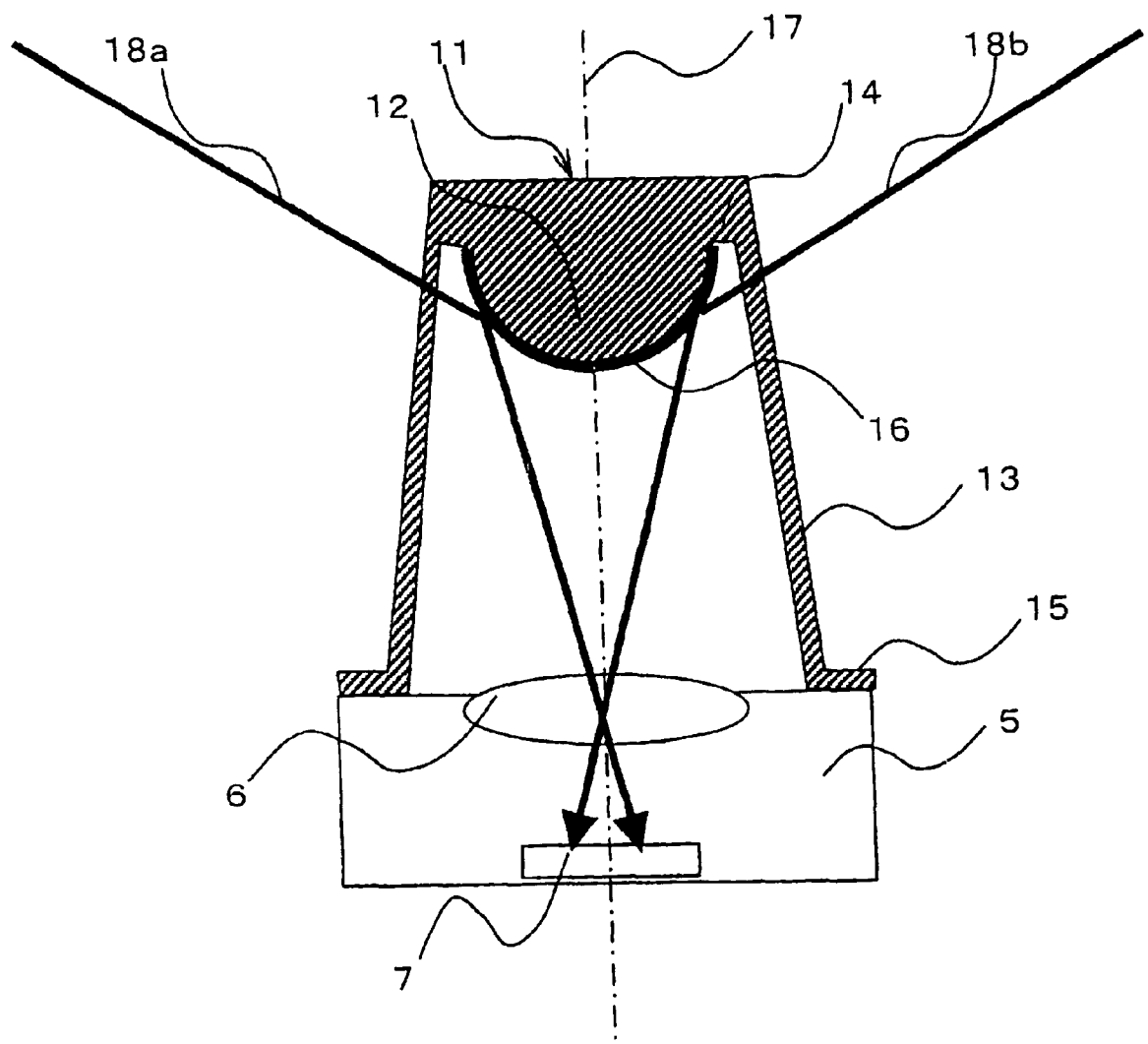
FIG. 2 is a sectional view of an omnidirectional visual camera according to Embodiment 2 of the present invention.
Figure 3:
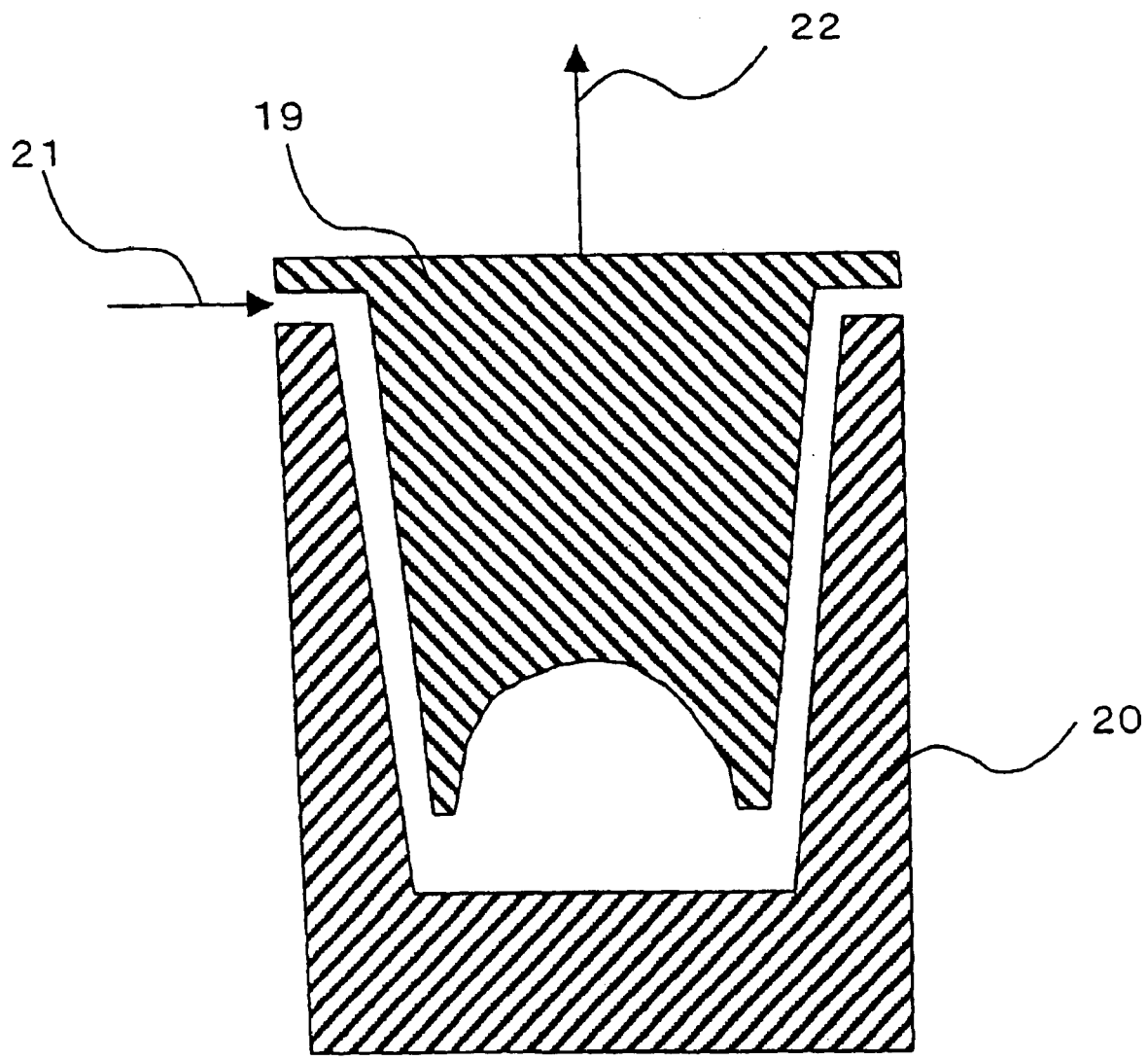
FIG. 3 is a sectional view of a mold for use in manufacturing a reflecting member according to Embodiment 2 of the present invention.

FIGS. 2 and 3 show an omnidirectional visual camera according to Embodiment 2.

The omnidirectional visual camera in FIG. 2 is composed of a reflecting member 11 and the camera section 5. The camera section 5 is similar to that of Embodiment 1 in terms of its functions and structure, so description thereof is omitted.

The reflecting member 11 is a rotationally symmetrical part integrally molded of a transparent material such as glass or an acrylic resin. The reflecting member 11 is composed of a rotating surface portion 12, a cylindrical portion 13, a connection section 14, and a joining section 15.

As in Embodiment 1, the rotating surface portion 12 has a rotating secondary curved surface, for example, a hyperboloidal shape, and has a reflecting film 16 coated thereon so as to form a mirror surface.

The cylindrical portion 13 has a cylindrical shape tapered so that its side closer to the camera section 5 has a larger diameter. The connection section 14 is a member for connecting the rotating surface portion 12 and the cylindrical portion 13 together. The joining portion 15 is a pedestal for joining the reflecting member 11 to the camera section 5, which is formed, for example, like a flange.

The rotating center axis of the rotating surface portion 12 and cylindrical portion 13 of the reflecting member 11, and the optical axis of the camera section 5 are arranged so as to align with each other. Reference numeral 17 denotes the aligned center axis.

With this configuration, since the rotating surface portion 12 has the reflecting film 16 formed into the mirror surface, extraneous incident lights such as the beams 18a and 18b pass through the transparent cylindrical portion 13 and are then reflected by the rotating surface portion 12. The beams then pass through the lens 6 of the camera to the light receiving element 7. Consequently, an omnidirectional image covering the angle of 360° around the center axis is picked up at a time.

FIG. 3 shows a mold for use in manufacturing the reflecting member 11.

In FIG. 3, reference numerals 19 and 20 denote molds for injection-molding the reflecting member 11. An arrow 21 shows a direction in which a molten transparent material is injected. Further, an arrow 22 shows a direction in which the mold 19 is moved during injection.

In injection molding, a molten transparent material (not shown) is injected and hardened in the gap formed between the molds 19 and 20, and the mold 19 is pulled out in the direction of the arrow 22 to manufacture a molding.

In general, the extremely sharp structure of the molds, early damage thereto, or the like reduces their lifetimes, thus increasing the costs of the molds and thus of the molding. Further, to prevent an excess of force from being applied to the molding when one of the molds is pulled out from the other, the molds must be designed to allow easy pull-put.

When the reflecting member 1 shown in FIG. 1 for Embodiment 1 is assumed to be manufactured by means of injection molding, a potions of the reflecting member 1 in which the rotating surface portion 2 and the cylindrical portion 3 are joined together has a very sharp structure, which is likely to damage the molds. Furthermore, since the cylindrical portion 3 has a cylindrical shape of a uniform diameter, the pull-out operation is expected to be difficult.

In Embodiment 2, the connection section 14 is provided between the rotating surface portion 12 and the cylindrical portion 13 to reduce the adverse effects of the sharp structure. The tapered structure of the cylindrical portion 13 also enables an easy pull-out operation.

As described above, in Embodiment 2, the integrally molded single reflecting member and camera enable omnidirectional images to be photographed. Further, due to the reduced number of sharp parts and considerations for an easy pull-out operation, an inexpensive omnidirectional visual camera can be provided which is suitable for mass production.

Obviously, the molds 19 and 20 for manufacturing the reflecting member 11 need not necessarily be shaped as shown in the figures. Further, the method of manufacturing the reflecting member 11 is not limited to injection molding. A similar shape can be produced, for example, by means of machining. Even with machining, a sharp structure, if any, may damage the molds during processing, so that the shape of the reflecting member of Embodiment 2 is sufficiently effective in this case.

Embodiment 3

Figure 4:
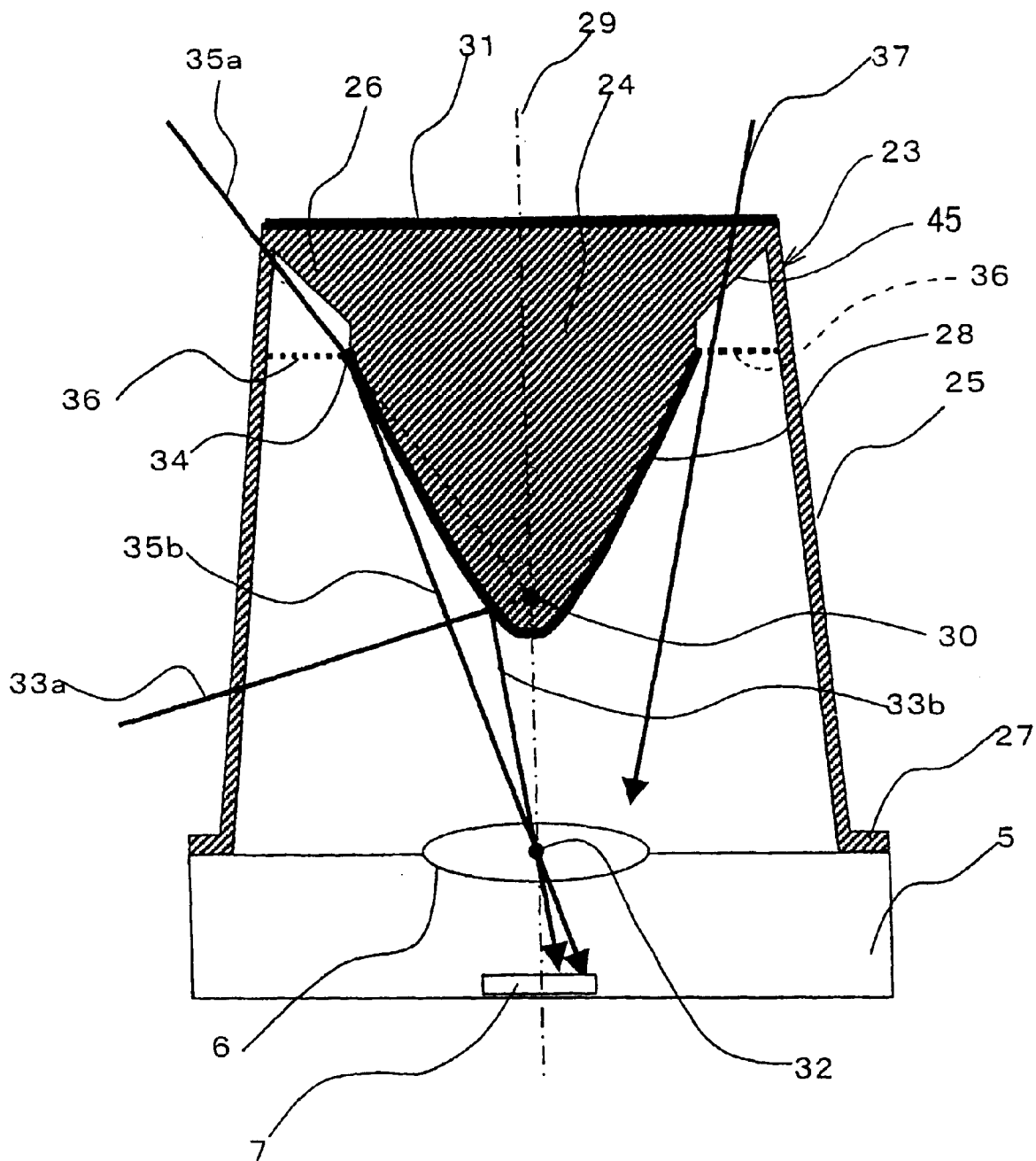
FIG. 4 is a sectional view of an omnidirectional visual camera according to Embodiment 3 of the present invention.

FIG. 4 shows an omnidirectional visual camera according to Embodiment 2.

In this figure, the omnidirectional visual camera is composed of a reflecting member 23 and the camera section 5. The camera section 5 is similar to that of Embodiment 1 in terms of its functions and structure, so description thereof is omitted.

The reflecting member 23 is a rotationally symmetrical part integrally molded of a transparent material such as glass or an acrylic resin. The reflecting member 23 is composed of a rotating surface portion 24, a cylindrical portion 25, a connection section 26, and a joining section 27.

The rotating surface portion 24 has a hyperboloidal shape and an internal focus 30. The rotating surface portion 24 also has a reflecting film 28 coated thereon so as to form a mirror surface. The cylindrical portion 25 has a cylindrical shape tapered so that its side closer to the camera section 5 has a larger diameter.

The connection section 26 is a member for connecting the rotating surface portion 24 and the tapered cylindrical portion 25 together. The joining portion 27 is a pedestal for joining the reflecting member 23 to the camera section 5, which is formed, for example, like a flange.

The reflecting member 23 has a light blocking film 31 coated on a surface of the rotating surface portion 24 and connection portion 26 which is opposite to the camera section 5, that is, the top surface of the reflecting member in FIG. 4.

The rotating center axis of the rotating surface portion 24 and cylindrical portion 25 of the reflecting member 23, and the optical axis of the camera section 5 are arranged so as to align with each other. Reference numeral 29 denotes the aligned center axis.

Further, a main point 32 of the lens 6 of the camera section 5 is arranged so as to align with an external focus of the hyperboloidal surface.

An incident light 33a is reflected by the hyperboloidal surface of the rotating surface portion 24, and the reflected light 33b passes through the main point 32 of the lens 6 to the light receiving element 7, thus enabling an omnidirectional image covering the angle of 360° to be photographed as in Embodiment 1.

Furthermore, due to a geometrical relationship, when the direction of the incident light 33a is extended to the inside of the rotating surface, it reaches the internal focus 30. Thus, as is well known, since the rotating surface portion 24 has a hyperboloidal surface, all the extensions of the incident light corresponding to the reflected light passing through the main point 32 of the lens 6 converge at the internal focus 30.

The connection section 26 of the omnidirectional visual camera configured as described above will be described in detail.

Attention is paid to a point 34 on an outer diameter portion of the rotating surface portion 24.

Here, it is assumed that an incident light 35a is incident on a point 34 and that a reflected light 35b is reflected by the rotating surface portion 24. If the reflected light 35b passes through the main point 32 of the lens 6, the internal focus 30 of the hyperboloidal surface of the rotating surface portion 24 is present on an extension of the incident light 35a.

For example, when the connection section 26 is shaped as shown by a dotted line 36 as in Embodiment 2, the incident light 35a is transmitted through the cylindrical portion 25 and the connection portion 26. Consequently, compared to light (for example, an incident light 33a) transmitted only through the cylindrical portion 25, the incident light 35a is attenuated and its optical path is shifted due to the refractive index of the material.

Thus, in Embodiment 3, the connection section 26 is shaped to form a notched recess portion 45 as shown in FIG. 4, so as not to block the incident light 35a, that is, so that the connection section 26 is not present on the extension joining the internal focus 30 and an end point 34 together. This structure allows reflected lights from all the areas of the rotating surface portion 24 to be appropriately formed into an image on the light receiving element 7.

Next, a description will be given of the light blocking film 31 formed on the surface of the rotating surface portion 24 and connection section 26 which is opposite to the camera section 5.

A beam 37 is an example of unwanted light that may occur when the light blocking film 31 is absent. Without the light blocking film 31, the unwanted light 37 enters the device through the connection section 26. Consequently, the camera section 5, which otherwise images only the reflected light from the rotating surface portion 24, also images the unwanted light 37.

In particular, a required light reflected by the rotating surface portion 24 forms a circular image on the light receiving element 7. Since, however, the light receiving surface of the light receiving element 7 such as a CCD is rectangular, the four sides have extra areas, and when an intense unwanted light enters such an area, the entire image quality is adversely affected. Thus, for prevention of such unwanted light, the light blocking film 31 is coated to eliminate the unwanted light, thereby making it possible to obtain an appropriate image.

Although the light blocking film 31 has only to block light, it is desirably subjected to mat black coating or another coating which absorbs light, in order to prevent internal reflections or the like.

As described above, in the omnidirectional visual camera of Embodiment 3, the integrally molded single reflecting member 23 and camera section 5 enable omnidirectional images to be photographed, and light is allowed to be appropriately incident all over the rotating surface portion 24. This indicates that the entire rotating surface portion can be effectively used over the image pickup range of the camera; this in turn is effective in reducing the size of the reflecting member. Furthermore, the light blocking film 31 blocks unwanted light to improve the quality of picked-up images.

In Embodiment 3, the connection section 26 in FIG. 4 is shaped to have the obliquely notched recess portion 45 so as not to block the incident light 35*a*. Other shapes, however, may be used unless they block the incident light 35*a*.

Figure 5:
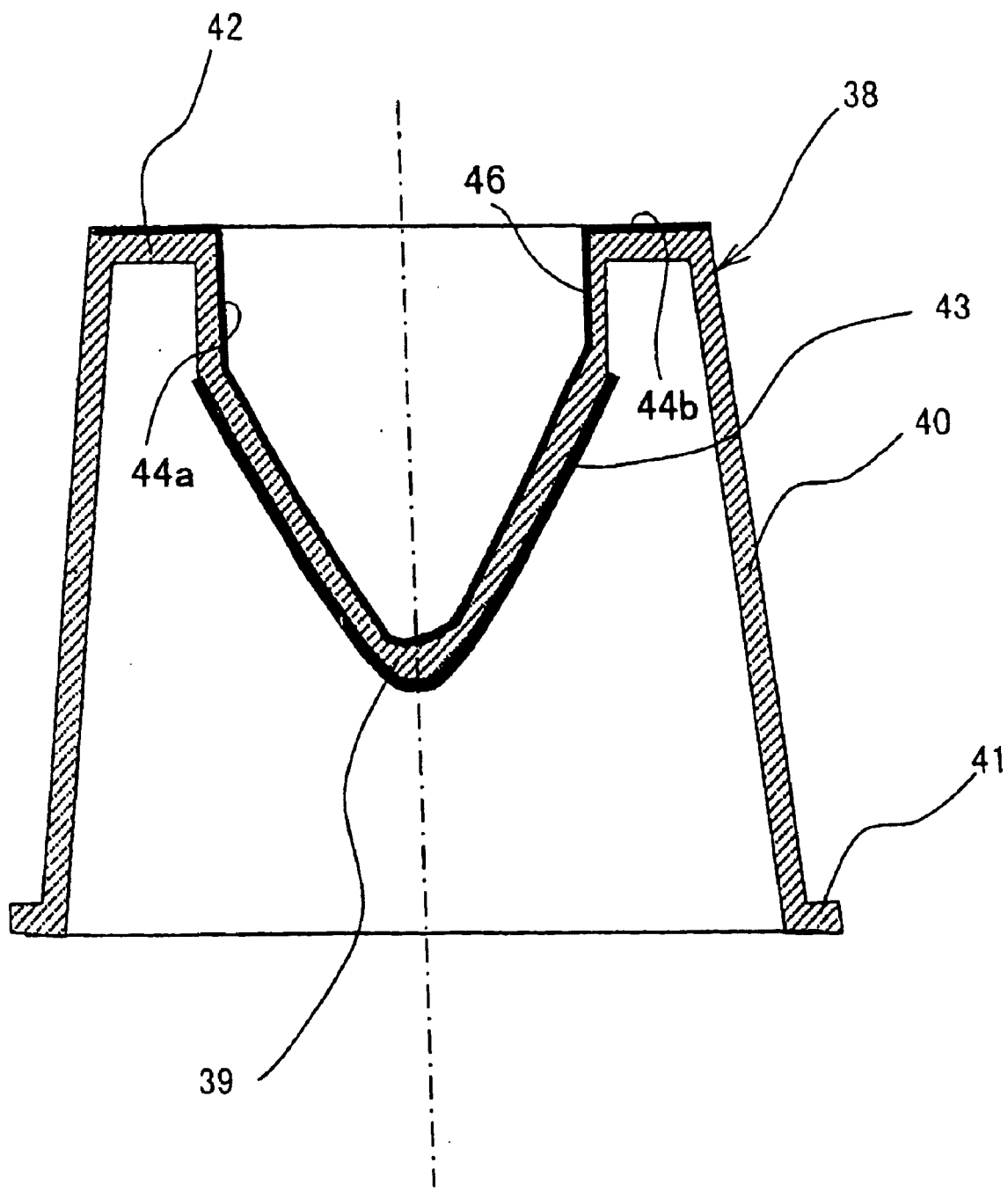
FIG. 5 is a sectional view of a reflecting member according to Embodiment 3 of the present invention.

Moreover, in Embodiment 3, the rotating surface portion 24 is thick, but it may be thin for a decrease in the amount of material required or easier processing. An example of such a shape is shown in FIG. 5. FIG. 5 shows the sectional shape of only the reflecting member.

In this figure, reference numeral 38 denotes a reflecting member, reference numeral 39 denotes a rotating surface portion, reference numeral 40 denotes a cylindrical portion having a substantially uniformly thin structure, reference numeral 41 denotes a joining section, and reference numeral 42 denotes a connection section. The rotating surface portion 39 has a reflecting film 43 coated thereon. Further, a light blocking film 46 is coated on a surface 44*a* of the rotating surface portion which is opposite to its surface having the reflecting film 43 thereon and on a rear surface 44*b* of the connection portion 42.

In such a structure, the connection section 42 is arranged above the rotating surface portion 39 relative to the sheet of the drawing. Accordingly, light is not hindered from entering the rotating surface portion 39, thus allowing the entire rotating surface portion to be effectively used. This in turn is effective in reducing the size of the reflecting member 38.

Moreover, the rotating surface portion 39 and the connection section 42 have the light blocking film 46 on the surfaces 44*a* and 44*b*, respectively, thereby preventing the entry of unwanted light. Accordingly, the structure of the reflecting member shown in FIG. 5 is expected to provide effects similar to those of the omnidirectional visual camera in FIG. 4. More specifically, if, in particular, the light blocking film 46 is formed on the surface 44*a*, the surface opposite to the reflecting film 43 is reliably prevented from being irradiated with an extraneous light. This in turn prevents an extraneous light applied to the surface opposite to the reflecting film 43 from adversely affecting the image as a stray light. If the device is used under the condition that the surface opposite to the reflecting film 43 is prevented from being irradiated with an extraneous light, it provides sufficient effects only with the light blocking film 46 on the surface 44*b*.

The thin structure of the entire reflecting member including the rotating surface portion as shown in FIG. 5 can also be implemented in Embodiments 1 and 2. In this case, it is clear that the effects of each embodiment are not degraded.

Further, in each embodiment, the portion of the reflecting member which is joined to the camera portion is shaped like a pedestal. However, the method of joining the reflecting member to the camera portion is not limited to this, but other shapes may be used as far as they enable the reflecting member and the camera section to be joined together.

What is claimed is:

1. An omnidirectional visual camera comprising:

a reflecting member comprising:
   a rotationally symmetric surface portion comprising a convex surface of a secondary rotationally symmetric curved surface;
   a cylindrical portion having cylindrical walls surrounding said rotationally symmetric surface portion and a cylindrical axis of rotation substantially aligning with an axis of rotation of said rotationally symmetric surface, and having a cylindrical inner diameter larger than an outer diameter of said rotationally symmetric surface portion; and
   a connection section for connecting one longitudinal end of said cylindrical portion with the outer diameter portion of said rotationally symmetric surface portion;
said rotationally symmetric surface portion, said cylindrical portion, and said connection section being integrally molded of a transparent material,
said rotationally symmetric surface portion comprising a mirror surface; and
a camera having an optical axis substantially aligning with the axis of rotation of said reflecting member and installed opposite to the convex surface of said rotationally symmetric surface portion,
said camera located for picking up a reflected image reflected from the convex surface of the rotationally symmetric surface portion of said reflecting member.

2. The omnidirectional visual camera according to claim 1, wherein one end surface of the cylindrical portion to which the rotationally symmetric surface portion is connected has a smaller diameter than the other end thereof.

* * * * *